United States Patent Office 2,962,481
Patented Nov. 29, 1960

2,962,481

VULCANIZATION OF NATURAL AND SYNTHETIC RUBBER

Vincent Kerrigan and Walter Reading Pryer, Manchester, England, assignors to Imperial Chemical Industries Limited, London, England, a corporation of Great Britain No Drawing. Filed Apr. 28, 1958, Ser. No. 731,127

Claims priority, application Great Britain May 8, 1957

3 Claims. (Cl. 260—79.5)

This invention relates to new nitrogenous organic compounds, useful as vulcanisation accelerators for rubber.

It has been proposed to use as vulcanisation accelerators compounds which may be represented by the formula:

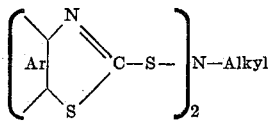

It has also been proposed to use as vulcanisation accelerators N-substituted benzthiazylsulphenamides, including N-tertiary alkyl benzthiazylsulphenamides.

We have now found that N-tertiary-octyl bis-(benzthiazyl-2-sulphen)imides, which have not hitherto been disclosed, are not only useful as vulcanisation accelerators but are superior to the above mentioned N-tertiary-alkyl benzthiazylsulphenamides and to known N-alkyl-bis-(benzthiazyl-2-sulphen)imides in respect of scorching properties.

Thus according to our invention we provide new compounds, namely N-tertiary-octyl-bis-(benzthiazyl-2-sulphen)imides, having the formula:

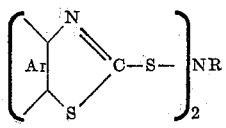

wherein R stands for a tertiary octyl radical.

As a tertiary octyl radical there may be mentioned for example the 1:1:3:3-tetramethylbutyl radical.

The compounds of our invention may be made by reaction of a benzthiazyl-2-sulphenhalide, for example the chloride, with a tertiary octylamine in a substantially anhydrous, inert organic solvent for example carbon tetrachloride, chloroform, benzene, chlorobenzene, dichlorobenzene, dibutyl ether and preferably one boiling below about 100° C. for example benzene, chloroform and carbon tetrachloride.

The reaction between the benzthiazyl-2-sulphenchloride and the tertiary octylamine may be carried out at a temperature between 0° C. and 75° C., preferably between 20° C. and 40° C.

It is preferred to use substantially two molecular proportions of benzthiazyl-2-sulphenchloride for each molecular proportion of tertiary octylamine, preferably in presence of an acid acceptor which may be a tertiary amine, for example pyridine, an alkyl pyridine or triethylamine. However larger relative proportions of tertiary octylamine may be used but it is then desirable that the reaction conditions be so chosen that the excess amine separates during the reaction in the form of its insoluble hydrochloride.

Conveniently, the benzthiazyl-2-sulphenchloride for use in the manufacture of the compounds of our invention may be prepared in known manner, for example by reaction of chlorine with 2:2'-bis-benzthiazyl-disulphide in a solvent for example carbon tetrachloride, and then reacted, without isolation, with the tertiary octylamine.

The compounds of our invention may also be made by reaction of benzthiazyl-2-sulphenchloride with an N-tertiary-octyl-benzthiazyl-2-sulphenamide conveniently in presence of an acid acceptor for example pyridine, an alkyl pyridine, or triethylamine, and in the presence of an inert, substantially anhydrous solvent for example carbon tetrachloride, chloroform, benzene, chlorobenzene, dichlorobenzene, dibutyl ether and the like, but preferably in a solvent boiling below about 100° C., for example carbon tetrachloride, chloroform and benzene.

The compounds of our invention are stable on storage and are of value as delayed-action accelerators in the vulcanisation of natural and synthetic rubbers, especially in respect of their non-scorching properties, and production of a vulcanised rubber of excellent physical properties.

Thus according to a further feature of the invention there is provided a process for the vulcanisation of natural or synthetic rubber which comprises incorporating in the rubber before vulcanisation an N-tert.-octyl-bis-(benzthiazyl-2-sulphen)imide, and then vulcanising the mixture so obtained.

The synthetic rubbers which may be used in the process of the invention include for example polymers of butadiene-1:3, iso-butene and 2-chlorobutadiene-1:3 and copolymers of these compounds with acrylonitrile, styrene, methyl methacrylate and other well-known polymerisable compounds which are used in the manufacture of these rubbers.

If desired, the rubbers may also contain known adjuvants for the manufacture of rubber compositions, for example fillers, channel and furnace blacks, antioxidants and pigments.

The amount of N-tertiary-octyl-bis-(benzthiazyl-2-sulphen)imide which may be incorporated in rubber in the process of the invention may be up to 10% of the weight of the rubber and preferably between 0.2% and 3.0%.

The vulcanisation of the rubber may be carried out according to the procedures commonly in use, for example by heating with sulphur at 140° C. for 20-30 minutes.

The accelerators of our invention are of value, not only because of the excellent physical properties of the vulcanisates obtained, but in particular because of the degree of safety from scorching afforded by their use. Owing to this latter property they are of especial value for use in the vulcanisation of rubbers in which are compounded furnace blacks, particularly high-reinforcing furnace blacks such as Super Abrasion and Intermediate Super Abrasion furnace blacks.

The invention is illustrated but not limited by the following examples in which the parts and percentages are by weight:

EXAMPLE 1

A mixture of 16.6 parts of finely ground 2:2'-bisbenzthiazyl disulphide and 400 parts of dry carbon tetrachloride is stirred vigorously and heated to a temperature between 45° and 50° C. Chlorine is passed into the resultant suspension until substantially all the solid has dissolved to form a yellowish brown solution. Excess chlorine is then removed by blowing dry nitrogen through the solution for about 15 minutes, and the solution is cooled to approximately 20° C. To the solution of benzthiazyl-2-sulphenchloride so obtained, 38.7 parts of anhydrous tertiary octylamine are added with stirring during 20 minutes, and the heat of reaction causes the temperature of the mixture to rise to about 40° C. The mixture is then heated at the boiling point for 1 hour, and then cooled to approximately 20° C. The mixture is washed successively with water, 5% aqueous acetic acid, water, 5% aqueous caustic soda solution, and finally with water, and is then dried by addition of anhydrous sodium sulphate. The carbon tetrachloride is removed from the mixture by distillation at a pressure of 15 mm. of mercury. The residual oil solidifies on cooling and is recrystallised from petrol ether (boiling range 60°–80° C.) to give 8.5 parts of product melting at a temperature between 105° and 107° C.

This product is substantially N-tertiary-octyl-bis(benzthiazyl-2-sulphen)imide. A mixture of the product with N-tertiary-octyl-2-benzthiazyl sulphenamide (M.P. 104° C.) melted at a temperature between 90° and 92° C. The product is found by analysis to contain N 9.4%; S 28.0%; theory for $C_{22}H_{25}N_3S_4$ requires N 9.2%, S 27.9%.

EXAMPLE 2

A rubber mix was made up from the following ingredients:

| | Parts |
|---|---|
| Smoked sheet | 100 |
| Zinc oxide | 5 |
| Super Abrasion Furnace Black | 47.5 |
| Stearic acid | 3 |
| Sulphur | 2.5 |
| N-tertiary-octyl-bis-(benzthiazyl-2-sulphen) imide | 0.65 |

Samples of this rubber mix were cured at 141° C. for periods from 15 to 40 minutes, and were found to possess the following properties:

*Tensile strength*

| Cured: | Kg./sq.cm. |
|---|---|
| 15 minutes | 234 |
| 20 minutes | 270 |
| 30 minutes | 287 |
| 40 minutes | 285 |

*Modulus at 300% elongation*

| Cured: | Kg./sq.cm. |
|---|---|
| 15 minutes | 98 |
| 20 minutes | 132 |
| 30 minutes | 166 |
| 40 minutes | 178 |

*Elongation at break*

| Cured: | Percent |
|---|---|
| 15 minutes | 555 |
| 20 minutes | 520 |
| 30 minutes | 485 |
| 40 minutes | 475 |

*Hardness*

| Cured: | ° B.S. |
|---|---|
| 15 minutes | 65 |
| 20 minutes | 70 |
| 30 minutes | 74 |
| 40 minutes | 75 |

The above rubber mixture, when submitted to a Mooney scorching test at 120° C. (time to reach a gradient of 2 units/min.) had a scorching time of 35 minutes. A sample of a rubber mix made up from the same ingredients, but replacing the N-tertiary-octyl-bis-(benzthiazyl-2-sulphen)imide by N-tertiary-octyl-benzthiazyl-2-sulphenamide had a scorching time of 30.5 minutes.

EXAMPLE 3

41.5 parts of finely ground 2:2′-bis-benzthiazyl disulphide are converted to 2-benzthiazyl sulphenchloride by the method described in Example 1. The carbon tetrachloride solution of the benzthiazyl sulphenchloride so obtained is added slowly to a stirred mixture of 69.3 parts of N-tertiary-octyl benzthiazyl sulphenamide, 22 parts of dry pyridine, and 500 parts of dry carbon tetrachloride. The temperature of the mixture during the addition rises, owing to the heat of reaction, to about 40° C. Stirring is continued at 40° C. for a further 45 minutes to complete the reaction, and then the mixture is cooled to approximately 20° C., and is then filtered, and the filtrate is washed successively with water, 5% aqueous acetic acid solution, water, 5% aqueous sodium carbonate solution, and finally with water. The solution is dried by addition of anhydrous sodium sulphate. The carbon tetrachloride is removed by distillation at a pressure of 15 mm. of mercury. The residual solid is recrystallised from petroleum ether (boiling range 80°–100° C.), to give N-tertiary-octyl-bis - (benzthiazyl - 2 - sulphen(imide identical with the product obtained in Example 1.

EXAMPLE 4

A mixture of 80.8 parts of finely ground 2:2′-bis-benzthiazyl disulphide and 700 parts of dry carbon tetrachloride is stirred vigorously and heated to a temperature between 40° and 45° C. Chlorine is passed into the resulting suspension until substantially all the solid has dissolved to form a yellowish brown solution. Excess chlorine is then removed by blowing dry nitrogen through the solution for about 15 minutes, and the solution is then cooled to approximately 20° C. The carbon tetrachloride solution of benzthiazyl-2-sulphenchloride so obtained is added slowly to a stirred mixture of 30 parts of tert-octylamine, 40.3 parts of pyridine and 200 parts of carbon tetrachloride. The temperature of the mixture during the addition rises, owing to the heat of reaction, to about 40° C. Stirring is continued for a further 30 minutes to complete the reaction, and then the mixture is cooled to approximately 20° C. and is filtered. The solid filtration residue, which is essentially pyridine hydrochloride, is washed with a little carbon tetrachloride and the washings combined with the bulk of the filtrate. The filtrate is washed successively, with water, 5% aqueous acetic acid solution, water 5% aqueous sodium carbonate solution and finally with water, and is then dried over anhydrous sodium sulphate. The carbon tetrachloride is removed by distillation under reduced pressure, and the residue consists of 93 parts of substantially pure N-tert-octyl-bis-(benzthiazyl-2-sulphen)imide as an oil which solidifies rapidly on cooling. The yield corresponds to 87.1% of theory, based on the tert-octylamine used.

What we claim is:

1. A process for the vulcanization of a member of the group consisting of natural and synthetic rubber which comprises incorporating in the rubber before vulcanization an N-tertiary-octyl-bis-(benzthiazyl-2-sulphen) imide having the formula

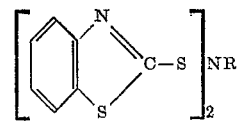

wherein R stands for a tertiary-octyl radical, and then vulcanizing the mixture so obtained.

2. A process for the vulcanization of a member of the group consisting of natural and synthetic rubber which comprises incorporating in the rubber before vulcanization up to 10% of the weight of said rubber of N-tertiary-octyl-bis-(benzthiazyl-2-sulphen) imide having the formula

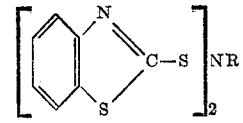

wherein R stands for a tertiary-octyl radical, and then vulcanizing the mixture so obtained.

3. A process for vulcanization as set forth in claim 2 wherein the amount of N-tertiary-octyl-bis-(benzthiazyl-2-sulphen) imide which is incorporated in the rubber is between 0.2% and 3% of the weight of the rubber.

References Cited in the file of this patent

UNITED STATES PATENTS

| | | |
|---|---|---|
| 2,321,305 | Messer | June 8, 1943 |
| 2,807,621 | Cooper | Sept. 24, 1957 |
| 2,873,277 | Sundholm | Feb. 10, 1959 |